May 7, 1968
J. CARNAZZA
3,382,420
TRIMMER CAPACITOR WHEREIN BOTH ENDS OF THE
ADJUSTMENT SCREW ARE SUPPORTED
Filed Nov. 4, 1966
2 Sheets-Sheet 1
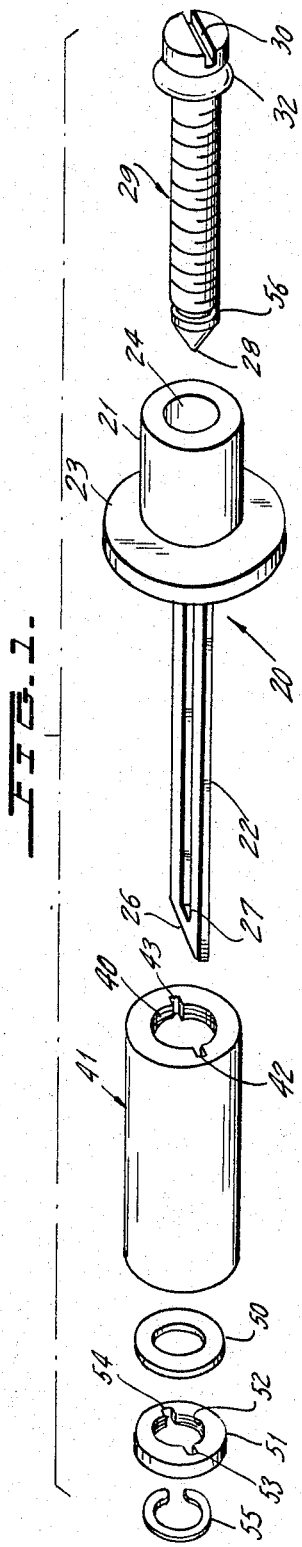
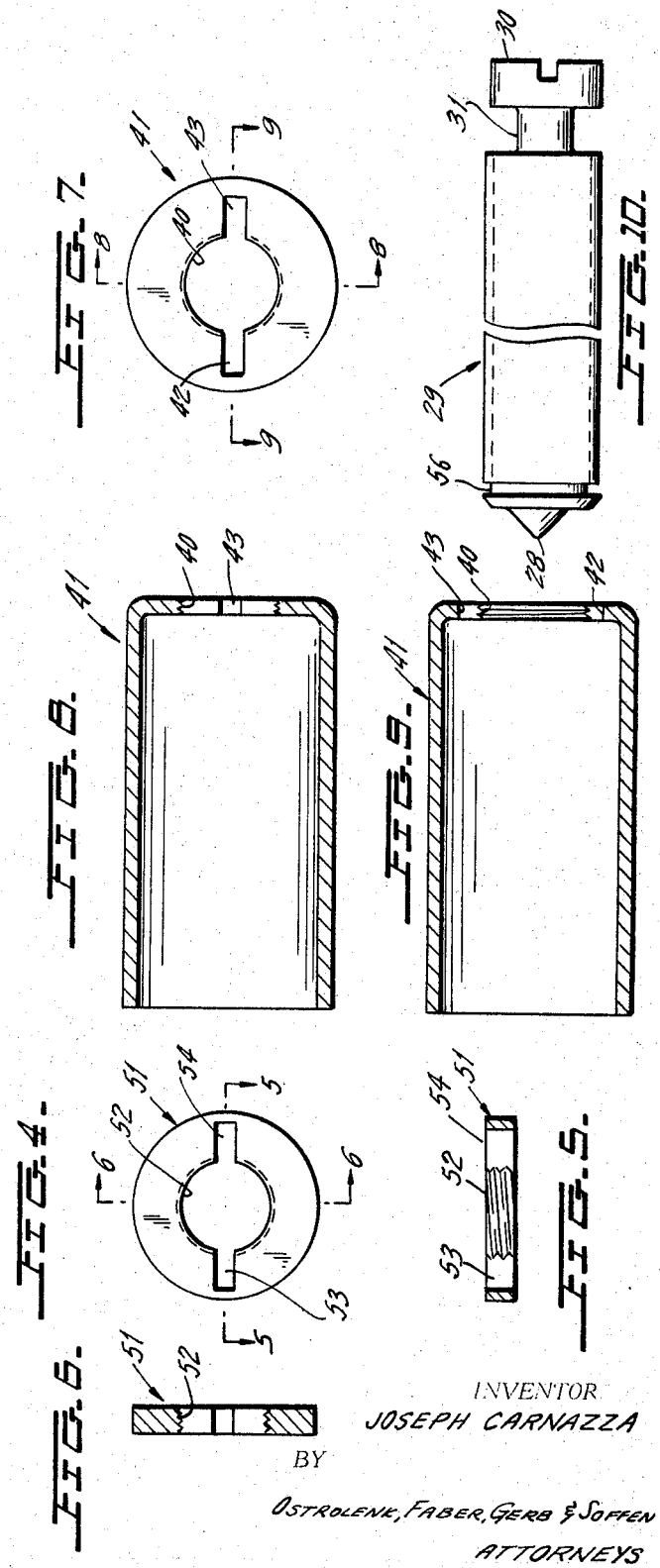
INVENTOR
JOSEPH CARNAZZA
BY
OSTROLENK, FABER, GERB & SOFFEN
ATTORNEYS

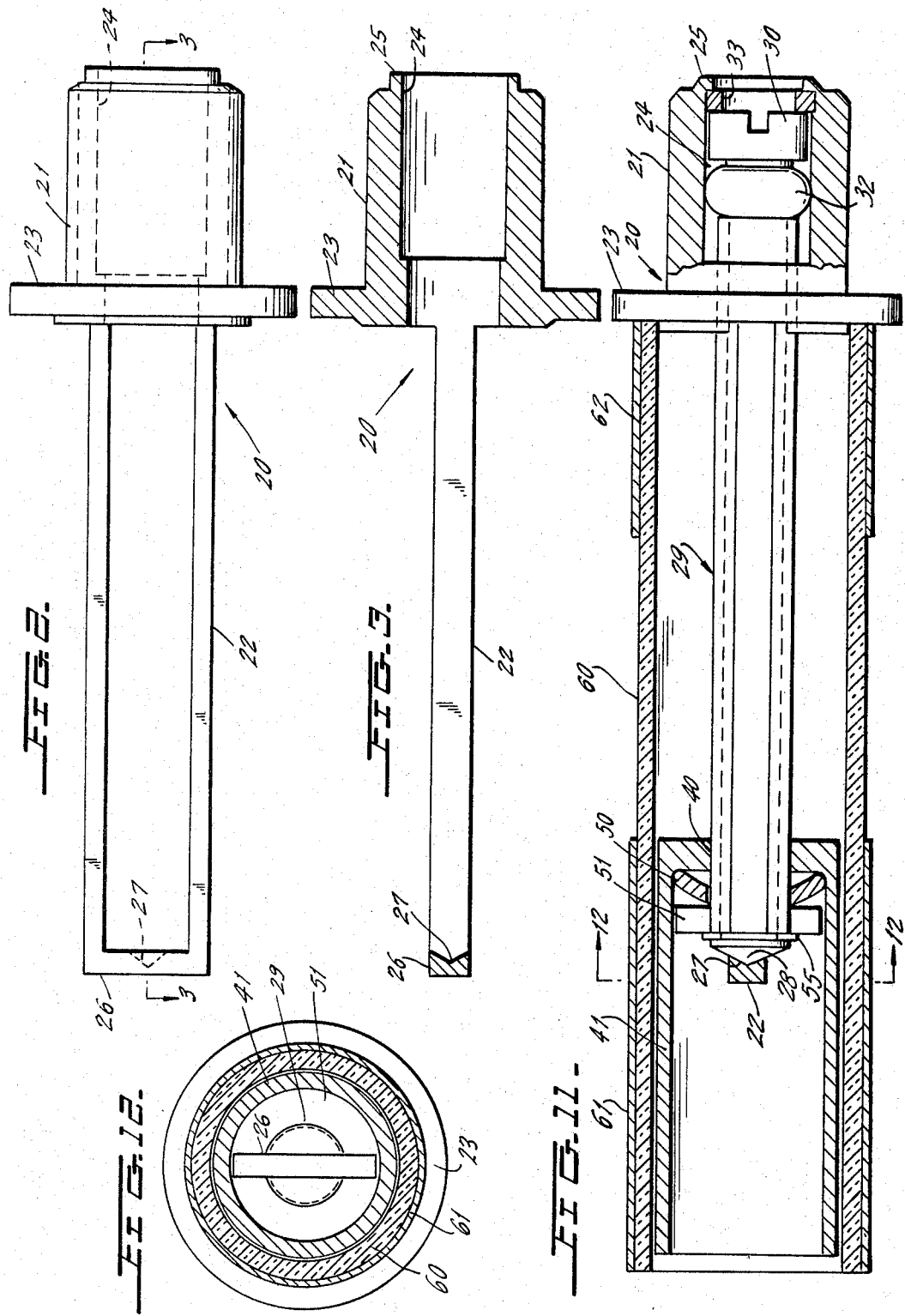

United States Patent Office 3,382,420
Patented May 7, 1968

3,382,420
TRIMMER CAPACITOR WHEREIN BOTH ENDS OF THE ADJUSTMENT SCREW ARE SUPPORTED
Joseph Carnazza, Brooklyn, N.Y., assignor to JFD Electronics Company, a division of Stratford Retreat House, Brooklyn, N.Y., a corporation of New York
Filed Nov. 4, 1966, Ser. No. 592,058
5 Claims. (Cl. 317—249)

ABSTRACT OF THE DISCLOSURE

The present disclosure describes a piston trimmer capacitor in which the piston electrode is axially movable within the interior of a dielectric cylinder without rotation. This piston is threadably carried by a rotatable adjustment screw where the adjustment screw has one end captured in a main support bushing while its other end is captured in the bottom of a frame member which extends from the support bushing, whereby both ends of the adjustment screw are supported and the adjustment screw may be rotated without advancing axially with respect to the frame. The piston, which is threaded on the adjustment screw, then has at least a portion of the frame extending through the bottom wall thereof so that, as the adjustment screw rotates, the piston will advance axially without rotation.

---

This invention relates to piston trimmer capacitors, and more specifically relates to a novel direct travel mechanism for axially moving the piston electrode of a piston trimmer capacitor without rotating the piston.

Direct travel mechanisms for piston trimmer capacitors are well known, and are typically shown in copending application Ser. No. 183,512 (JFD-2), filed Mar. 29, 1962, in the name of Hugo Seiden, entitled "Direct Travel Mechanism," and assigned to the assignee of the present invention.

It is desirable to axially move the piston electrode of a piston trimmer capacitor without rotation, since rotation of the piston will cause "reversals" or non-linearities in the characteristic of capacitance versus adjustment screw rotation. Where high accuracy adjustment of the capacitor is desired, it is apparent that such reversals in the characteristic are undesirable. Such reversals are substantially decreased or eliminated when the piston is caused to move axially along the interior of the dielectric tube within which it is positioned and without rotation, since the rotation of the piston apparently causes a variably changing air gap between the piston and dielectric tube interior which gives rise to the reversal characteristic.

The present invention provides a novel structure for guiding the piston for axial motion without rotation which lends itself to simplicity of manufacture and decreased expense of the device.

More particularly, the main support body of the piston trimmer capacitor, commonly called the support bushing, has an elongated U-shaped frame with the ends of the U-shaped frame joined to the main bushing structure. The main bushing structure carries the dielectric tube and includes a mounting flange which has an opening within which the adjustment screw head is captured. The adjustment screw then extends along the interior of the elongated U-shaped frame and the surrounding dielectric tube, and is captured between the end of the U-shaped frame and the main bushing body in such a manner that the adjustment screw can be rotated with respect to the bushing without advancing axially with respect to the bushing. The piston structure has a threaded opening in the base thereof and a keying slot which extends beyond the diameter of the opening. The keying slot is dimensioned such that the piston base can slide over the end of the elongated U-shaped frame portion of the support bushing, while the adjustment screw which extends along the center of the U-shaped frame is threaded into the threaded opening in the piston base. A suitable spring washer is then captured between the interior of the piston base and a threaded washer which is threaded on the adjustment screw and has a keying slot similar to the slot in the piston which also slides over the frame.

In operation, when the adjustment screw is rotated, the threaded washer and piston are prevented from rotation because of the engagement of their keying slots with the frame so that the piston and washer subassembly will axially traverse along the frame without rotation. The tension spring captured between the piston and the threaded washer will serve to absorb back-lash and to set the torque required to rotate the adjustment screw.

Accordingly, a primary object of this invention is to provide a novel, inexpensive direct travel mechanism for piston trimmer capacitors wherein the adjustment screw is supported at both of its ends.

Another object of this invention is to provide a novel mechanism for piston trimmer capacitors which simplifies the manufacture of such devices.

Yet another object of this invention is to provide an inexpensive piston trimmer capacitor which is virtually free of reversals in the characteristic of capacitance versus adjustment screw rotation.

These and other objects of this invention will become apparent from the following description when taken in connection with the drawings, in which:

FIGURE 1 is an exploded perspective view of the novel capacitor constructed in accordance with the present invention.

FIGURE 2 is a side plan view of the support bushing manufactured in accordance with the invention.

FIGURE 3 is a cross-sectional view of FIGURE 2 taken across the section line 3—3 in FIGURE 2.

FIGURE 4 is a front view of the threaded washer of the invention.

FIGURE 5 is a cross-sectional view of FIGURE 4 taken across the section line 5—5 in FIGURE 4.

FIGURE 6 is a cross-sectional view of FIGURE 4 taken across the section line 6—6 in FIGURE 4.

FIGURE 7 is a bottom plan view of the piston used in accordance with the invention.

FIGURE 8 is a cross-sectional view of FIGURE 7 taken across the section line 8—8 in FIGURE 7.

FIGURE 9 is a cross-sectional view of FIGURE 7 taken across the section line 9—9 in FIGURE 7.

FIGURE 10 is a side plan view of the adjustment screw used in accordance with the invention.

FIGURE 11 is a cross-sectional view of the assembled structure, as shown in FIGURE 1, including the components illustrated in FIGURES 2 through 10.

FIGURE 12 is a cross-sectional view of FIGURE 11 taken across the section line 12—12 in FIGURE 11.

Referring first to FIGURES 1, 2 and 3, the novel piston trimmer capacitor of the invention includes a main support bushing 20 which has a main bushing body 21, and an elongated U-shaped frame 22. The body 21 has an enlarged mounting flange 23 of the usual type and an interior opening 24.

As illustrated in FIGURES 2 and 3, the right-hand end of the bushing portion 21 has a thin cylindrical portion 25 extending therefrom which is to be subsequently clinched inwardly, as shown in FIGURE 11 in order to assemble the capacitor. The elongated U-shaped frame 22 may be formed integrally with body 21 or, if desired, could be formed of a separate wire bent to form and subsequently secured to the main body 21. A bottom leg 26 of frame 22 is then provided with a triangular depression 27 therein for receiving and locating the pointed end 28 of the adjustment screw 29.

The adjustment screw 29 is illustrated in FIGURES 1, 10 and 11 and has a slotted end 30 which has a necked-down region 31 (FIGURE 10) which carries therein a suitable sealing O-ring 32. The diameter of the main threaded portion of adjustment screw 29 is smaller than the interior spacing between the legs of the elongated U-shaped frame 22 and is smaller than the interior of opening 24 in the main body portion 21 of bushing 20.

Adjustment screw 29 is supported within the bushing 20, as illustrated in FIGURE 10, where its pointed end 28 is fitted into opening 27 in bottom leg 26 while the head end of the screw is captured in the right-hand side of bushing portion 21 by the clinching over of the extending tube 25. Note that a nylon ring 33 may be interposed between the end of head 30 and of clinch tube 25 in FIGURE 11 to provide ease of rotation of the screw 29. The O-ring 32 is then sufficiently sized as to fit into the interior diameter of opening 24 while providing a good seal around the periphery of the ring 32.

Adjustment screw 29 is threaded into the threaded opening 40 in piston shell 41. Piston shell 41 is a standard type of piston for the usual piston trimmer capacitor except that it is provided with this threaded opening 40 and is additionally provided with a keying slot having slot ends 42 and 43 extending across the bottom of piston 41 with the slot extending across the bottom region of opening 40. The length of the slot having ends 42 and 43 is made just greater than the full width of U-shaped frame 22 so that the end of piston 41 can slide onto frame 22 with rotation thereof being prevented by the engagement of frame 22 with slot ends 42 and 43.

A standard cup-shaped spring 50, having an external diameter slightly less than the interior diameter of piston 41, is then captured between the bottom of piston 41 and the right-hand surface of a threaded washer 51.

Threaded washer 51, which is shown in FIGURES 1, 4, 5, 6, 11 and 12, has a threaded opening 52 identical to the opening 40 in piston 41 and a keying slot having slot ends 53 and 54 substantially identical to slotted ends 42 and 43 of piston 41. Both washer 51 and piston 40 are threaded on the adjustment screw 29 with the frame portion 22 capturing slot ends 43 and 44 of piston 41 and slotted ends 53 and 54 of washer 51. The axial spacing of washer 51 and the bottom of piston 41 determine the compression of spring 50 and thus the torque which is required to rotate screw 29 with respect to these members. A suitable snap-ring 55, shown in FIGURES 1 and 11, is then snapped into grooves 56 (FIGURES 1 and 10) of adjustment screw 29 to serve as a stop for the right-hand motion of the assembly of piston 41 and threaded washer 51.

The entire assembly of frame portion 22 and piston 41 is then enclosed within the standard type of dielectric tube 60 which has a metallic coating 61 on its left-hand end, as shown in FIGURE 11, which serves as the fixed electrode of the capacitor which cooperates with the metallic piston 41 which serves as the movable electrode of the capacitor. A second metallic coating 62 is placed on dielectric tube 60 to permit securement of the tube 60 to the metallic flange 23 by soldering, or the like.

The complete assembly illustrated in FIGURE 11 will be understood to be composed of relatively simple parts which could be easily manufactured. Moreover, the arrangement lends itself to simplified assembly, whereupon the resulting device is relatively inexpensive when compared to prior art types of direct travel mechanism trimmer capacitors.

In assembling the device, the piston 41 is first put into the legs of frame 22 with the slots 42 and 43 of the piston riding on frame 22. Thereafter, spring 50 is put into position and threaded washer 51 is brought atop the spring 50 with the slots 53 and 54 riding on frame 22, until some suitable compression force is obtained.

Thereafter, adjustment screw 29 is inserted through opening 24 and screwed into piston 41 and washer 51 until screw end 28 is seated in opening 27 in frame bottom 26. Washer 33 is then inserted and member 25 is clinched over in order to rigidly axially locate screw 29 while still permitting the rotation thereof.

Clearly, slotted ends 53 and 54 of washer 51 and slotted ends 42 and 43 of the piston, will be guided onto the legs of frame 22. The snap ring 55 is snapped into position, to provide a stop for the upper motion of the piston. The tube 60 is last connected to flange 23, and the assembly is completed.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A piston trimmer capacitor; said piston trimmer capacitor comprising a main support body having a central opening therein; a hollow dielectric tube having one end thereof secured to said main support body and being coaxial with said central opening, a fixed conductive electrode fixed to said dielectric tube; a conductive piston electrode positioned within the interior of said dielectric tube and axially movable therein and a rotatable adjustment screw connected to said piston for moving said piston within said dielectric tube to alter the spacing between said conductive piston electrode and said fixed conductive electrode; an elongated at least partially U-shaped frame extending from said main support body and interiorly of said dielectric tube; said rotatable adjustment screw extending through said central opening in said main support body and into the interior of said dielectric tube and between the extending legs of said elongated U-shaped frame; means capturing the opposite ends of said adjustment screw preventing linear motion of said adjustment screw with respect to said main support body and permitting rotation of said adjustment screw; said means including the first end of said screw engaging the bottom of said U-shaped frame within the conductive piston, said piston having a bottom wall extending in a plane perpendicular to the axis of said adjustment screw and a threaded opening in said bottom wall; said piston having an axially extending cylindrical wall telescoping over said U-shaped frame; said bottom wall of said piston having opening means receiving at least a side leg of said elongated U-shaped frame; said adjustment screw threaded into said threaded opening in said piston bottom wall.

2. The piston trimmer capacitor as set forth in claim 1 wherein said means for capturing said adjustment screw includes second means connected to said main support body engaging the opposite end of said adjustment screw.

3. The piston trimmer capacitor as set forth in claim 1 which further includes a spring means and a spring washer means; said spring washer having a threaded opening therein and opening means therein receiving at least said side leg of said U-shaped frame; said adjustment screw extending through said bottom wall of said piston, through an opening in said spring means and threaded into said threaded opening in said spring washer to capture said spring means between said piston and said spring washer.

4. The piston trimmer capacitor as set forth in claim 3 wherein said means for capturing said adjustment screw includes first end means of said adjustment screw engaging the bottom of said U-shaped frame, and second means connected to said main support body engaging the opposite end of said adjustment screw.

5. The piston trimmer capacitor as set forth in claim 1 wherein said opening means comprises a slot in said bottom wall of said piston fitted over said side leg of said elongated U-shaped frame.

References Cited

UNITED STATES PATENTS 3,263,140  7/1966  Lafer _____ 317—249

DARRELL L. CLAY, *Primary Examiner.*

E. GOLDBERG, *Assistant Examiner.*